(12) United States Patent
Marc (10) Patent No.: US 7,232,299 B2
(45) Date of Patent: Jun. 19, 2007

(54) FLOW MOLDING APPARATUS WITH MULTIPLE LAYERS OF MOLDS AND ELECTRODES

(75) Inventor: Michel Marc, Lenexa, KS (US)

(73) Assignee: Vertex, L.L.C., Lenexa, KS (US)

( * ) Notice: Subject to any disclaimer, the term of this patent is extended or adjusted under 35 U.S.C. 154(b) by 326 days.

(21) Appl. No.: 10/961,895

(22) Filed: Oct. 8, 2004

(65) Prior Publication Data

US 2006/0078634 A1 Apr. 13, 2006

(51) Int. Cl.
*B29C 35/12* (2006.01)
*B29C 43/04* (2006.01)

(52) U.S. Cl. .................. 425/3; 425/174.8 R; 425/234; 425/359; 425/174

(58) Field of Classification Search ............... 425/3, 425/174, 174.6, 174.8 R–174.8 E, 233–234, 425/338, 359, DIG. 33
See application file for complete search history.

(56) References Cited

U.S. PATENT DOCUMENTS

| | | | |
|---|---|---|---|
| 4,268,238 A | 5/1981 | Marc | |
| 4,441,876 A | 4/1984 | Marc | |
| 4,524,037 A | 6/1985 | Marc | |
| 4,851,167 A | 7/1989 | Marc | |
| 5,082,436 A * | 1/1992 | Choi et al. ............ | 425/174.8 R |
| 5,772,946 A * | 6/1998 | Kaminaga et al. ....... | 425/405.1 |

OTHER PUBLICATIONS

Tinyann International Co., LTD., Hydraulic Hot Press Machine (http://exporter.com.tw/p-2.htm.), 2004.

* cited by examiner

*Primary Examiner*—Yogendra N. Gupta
*Assistant Examiner*—Thu Khanh T. Nguyen
(74) *Attorney, Agent, or Firm*—Stinson Morrison Hecker LLP (57) ABSTRACT

A flow molding apparatus with multiple layers of molds and electrodes is disclosed. In an exemplary embodiment, the apparatus includes top and bottom electrodes with an intermediate electrode positioned therebetween. A first mold is disposed between the top electrode and the intermediate electrode, and a second mold is disposed between the bottom electrode and the intermediate electrode. Preferably, a plurality of metallic locking fixtures are attached to the top and bottom electrodes for securing the apparatus in a closed position. An electromagnetic energy source is operably connected to the electrodes such that the top and bottom electrodes are grounded and the intermediate electrode carries a high voltage. As such, an alternating electric field may be established across each of the first and second molds during a heating cycle.

31 Claims, 5 Drawing Sheets

FLOW MOLDING APPARATUS WITH MULTIPLE LAYERS OF MOLDS AND ELECTRODES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is generally directed to the field of flow molding, and is more specifically directed to a unique flow molding apparatus that includes multiple layers of molds and electrodes for manufacturing a plurality of molded articles.

2. Description of Related Art

Various flow molding apparatuses are known in the art that employ dielectric heating to mold a plastic part from a formable plastic material. In all of these apparatuses, the plastic material is placed between two electrodes (e.g., a high voltage top electrode and a grounded bottom electrode) such that the material effectively becomes the dielectric of a capacitor. An alternating electric field generated between the electrodes causes polar molecules in the plastic material to be attracted and repelled by the rapidly changing polarity of the electric field. The friction resulting from this molecular movement causes the plastic material to heat throughout its entire mass to thereby form the plastic part.

One flow molding apparatus known in the art for making plastic parts comprises a top electrode and a bottom electrode with a two-piece mold disposed therebetween. The mold defines a molding cavity in which a plastic material may be placed. In operation, an alternating electric field is applied across the molding cavity to form the plastic part. Preferably, the current field lines are perpendicular to the plastic material at all points along its surface to thereby provide a uniform temperature throughout the plastic material. In addition, the top and bottom electrodes substantially match the configuration of the plastic part that is being fabricated such that the distance between the electrodes is constant in order to provide uniform heating of the plastic material. An example of this type of a flow molding apparatus is disclosed in U.S. Pat. No. 4,268,238 (which is incorporated herein by reference).

Another flow molding apparatus known in the art for making plastic parts comprises a top electrode and a bottom electrode with a mold disposed therebetween. The mold has a non-uniform thickness so as to allow the molding of a non-uniform plastic part from a plastic material placed between the mold and the top electrode. In order to provide uniform heating throughout the plastic material, a constant capacitance is maintained throughout all of the different thickness sections of the plastic part. This may be accomplished by equalizing the relative dielectric constants between the plastic material and the mold, preferably by altering the relative dielectric constant of the mold via the use of additives. Alternatively, the capacitance may be equalized by modifying the spacing between the top and bottom electrodes in the different thickness sections of the plastic part. An example of this type of a flow molding apparatus is disclosed in U.S. Pat. No. 4,441,876 (which is incorporated herein by reference).

Another flow molding apparatus known in the art for making foamed plastic parts comprises a top electrode and a bottom electrode with a mold disposed therebetween. A plastic foam material may be placed in a cavity of the mold and then compressed during the heating cycle. After the heat is terminated, the compressed plastic foam material is permitted to expand as it cools so as to conform to the shape of the mold and thereby form the foamed plastic part. An example of this type of a flow molding apparatus is disclosed in U.S. Pat. No. 4,524,037 (which is incorporated herein by reference).

Yet another flow molding apparatus known in the art for making foamed plastic parts comprises a top electrode and a bottom electrode with a two-piece mold disposed therebetween. The mold supports a diaphragm such that a plastic foam material may be placed between the diaphragm and the bottom mold. A fluid is injected into the mold above the diaphragm so as to initially deflect the diaphragm and thus expel substantially all of the air from the mold. The fluid is then extracted from the mold during the heating cycle, which causes a vacuum in the mold to thereby assist in the expansion of the plastic foam material. An example of this type of an apparatus is disclosed in U.S. Pat. No. 4,851,167 (which is incorporated herein by reference).

All of the flow molding apparatuses described above may be used or adapted to fabricate foamed plastic parts. To do so, the mold disposed between the top and bottom electrodes is pressurized so that a plastic foam material placed within the molding cavity may expand and conform to the shape of the mold. In order to prevent the release of pressure within the mold, one or more clamps are attached to the top and bottom electrodes so as to lock the apparatus in a closed position. These clamps are formed of an insulative material so as not to short the top electrode (which typically carries a high voltage) to the bottom electrode (which is typically grounded). Because of the relatively low tensile strength of available insulative materials, however, the clamps must be very large in size in order to withstand the pressure developed within the mold. As such, the large amount of space occupied by the clamps decreases the working area around the mold. In addition, the relatively low tensile strength of the clamps may cause the foamed plastic parts to bow resulting in inaccurate sizing of the parts. Thus, there is a need in the art for a flow molding apparatus that does not require the use of such clamps to lock the apparatus in a closed position during the molding cycle.

BRIEF SUMMARY OF THE INVENTION

The present invention is directed to a flow molding apparatus that may be used to manufacture a plurality of molded articles. In general, the apparatus includes multiple layers of molds and electrodes that are arranged such that each of the molds is disposed between two of the electrodes. An electromagnetic energy source is operably connected to the electrodes in such a manner as to establish an alternating electric field across each of the molds to thereby form the molded articles. Preferably, the outer electrodes of the apparatus both carry the same potential so that a metallic locking fixture may be used to secure the apparatus in a closed position during the molding cycle.

In an exemplary embodiment, the flow molding apparatus includes a top electrode and a bottom electrode with an intermediate electrode positioned therebetween. A first mold is disposed between the top electrode and the intermediate electrode, and a second mold is disposed between the bottom electrode and the intermediate electrode. Each of the molds includes multiple molding cavities for receiving a moldable material therein. An electromagnetic energy source is operably connected to the electrodes such that the top and bottom electrodes are grounded and the intermediate electrode carries a high voltage (e.g., ±5,000 volts). As such, an alternating electric field may be established across each of the molds (in combination with pressurization of the molds) to thereby form a plurality of molded articles.

In this embodiment, six metallic locking fixtures are attached to the top and bottom electrodes to thereby secure the apparatus in a closed position. Each of the locking fixtures has an upper section fixedly attached to the top electrode and a lower section fixedly attached to the bottom electrode. Lock bars are also provided to interlock the upper and lower sections together when the apparatus is moved to the closed position. Importantly, the metallic locking fixtures have a tensile strength that is sufficient to withstand the pressure developed within the molds during the molding cycle.

The flow molding apparatus of the present invention has several advantages over the prior art. First, because the outer electrodes of the apparatus may carry the same potential, locking fixtures may be used that are formed of a stronger metallic material. Also, by dividing the surface area of a single mold into a plurality of layered molds, the force required to secure the apparatus in a closed position may be decreased to thereby permit the use of smaller locking fixtures. In addition, layering a plurality of molds on top of one another allows the manufacture of a greater number of molded articles in a single molding cycle. Of course, other advantages of the present invention will be apparent to one skilled in the art.

BRIEF DESCRIPTION OF THE DRAWINGS

The present invention will be described in greater detail in the following detailed description of the invention with reference to the accompanying drawings that form a part hereof, in which.

DETAILED DESCRIPTION OF THE INVENTION

The present invention is directed to a flow molding apparatus that may be used to manufacture a variety of different types of molded articles for use in a variety of different industries. In general, the apparatus includes multiple molds and electrodes that are layered such that each of the molds is disposed between two of the electrodes. An electromagnetic energy source is operably connected to the electrodes such that some carry a high voltage (e.g., ±5,000 volts) and others are grounded so as to establish an alternating electric field across each of the molds. The apparatus also includes one or more locking fixtures attached to the outer electrodes for securing the apparatus in a closed position. Preferably, the outer electrodes carry the same potential (e.g., both are grounded) so that the locking fixtures may be formed of a metallic material. If the molds are pressurized, the tensile strength of the locking fixtures must be sufficient to withstand the pressure developed within the molds.

In operation, the flow molding apparatus is moved to an open position to permit the loading of a moldable material into each of the molds. After loading, the apparatus is moved to a closed position and locked in place with the locking fixtures. The electromagnetic energy source is then activated so as to establish an alternating electric field across each of the molds to thereby heat the moldable material. The molds may also be pressurized to cause expansion of the moldable material within the molds. After heating, the apparatus is cooled such as by running a coolant through passages in the electrodes. At the end of the molding cycle, the locking fixtures are released and the apparatus is moved back to the open position to permit the unloading of the molded articles from each of the molds.

Referring to FIGS. 1–5, an exemplary embodiment of a flow molding apparatus constructed in accordance with the present invention is designated generally as reference numeral 10. Flow molding apparatus 10 generally comprises three electrodes (an outer top electrode 12, an outer bottom electrode 14, and an intermediate electrode 16), two molds (a first mold 18 and a second mold 20), an electromagnetic energy source 22, a pair of scissor mechanisms 24a and 24b, a plurality of locking fixtures 26a, 26b, 26c, 26d, 26e and 26f, and a pair of lock bars 28a and 28b. Each of these components will now be described in detail.

Figure 1:
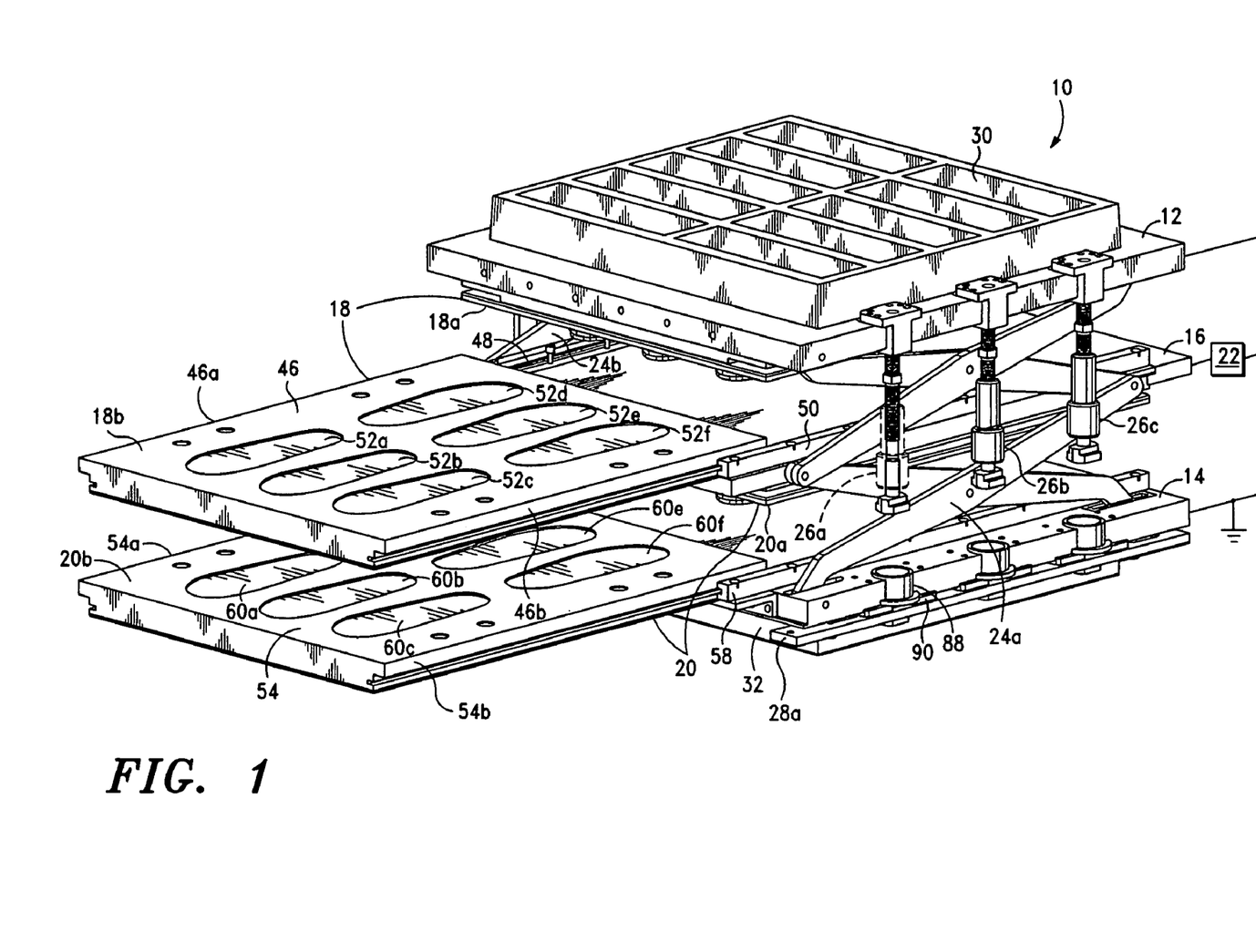
FIG. 1 is an isometric view of a flow molding apparatus constructed in accordance with the present invention, wherein the apparatus is shown in the open position to permit loading and unloading of the molds.
Figure 4:
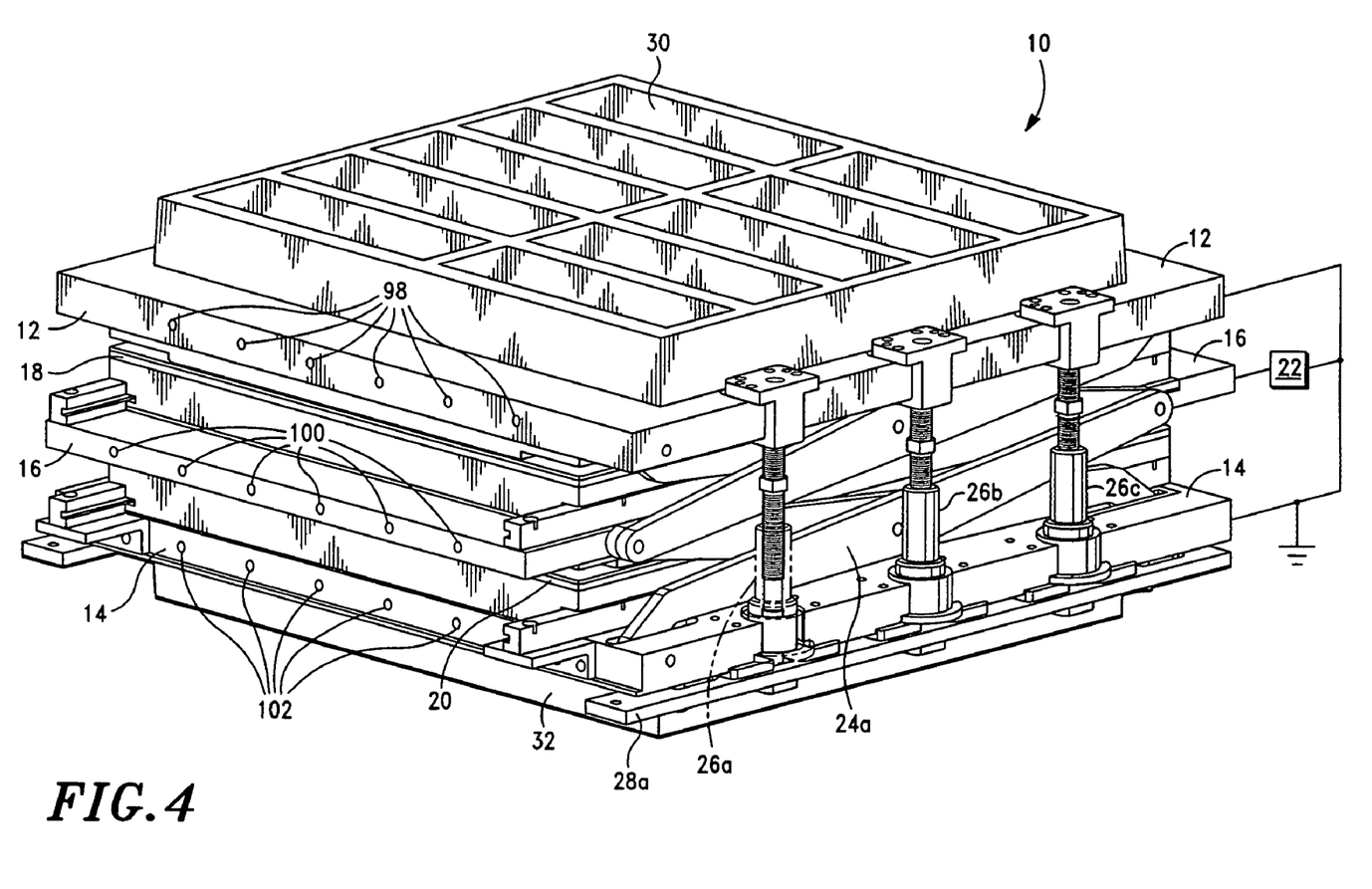
FIG. 4 is an isometric view of the flow molding apparatus of FIG. 1, wherein the apparatus is shown in the closed position during a molding cycle.

As shown in FIGS. 1 and 4, apparatus 10 includes a top electrode 12 and a bottom electrode 14 with an intermediate electrode 16 positioned therebetween. In this embodiment, top electrode 12, bottom electrode 14 and intermediate electrode 16 each comprise a generally square-shaped plate that may be formed of any conductive material. Preferably, a reinforcement structure 30 is affixed to the top surface of top electrode 12 and another reinforcement structure 32 is affixed to the bottom surface of bottom electrode 14. Reinforcement structures 30 and 32 are provided to prevent bowing of top electrode 12 and bottom electrode 14, respectively. Each of the electrodes is connected to an electromagnetic energy source 22 that is operable to generate a first alternating electric field between top electrode 12 and intermediate electrode 16 and a second alternating electric field between bottom electrode 14 and intermediate electrode 16 (as will be described in greater detail hereinbelow).

Figure 2:
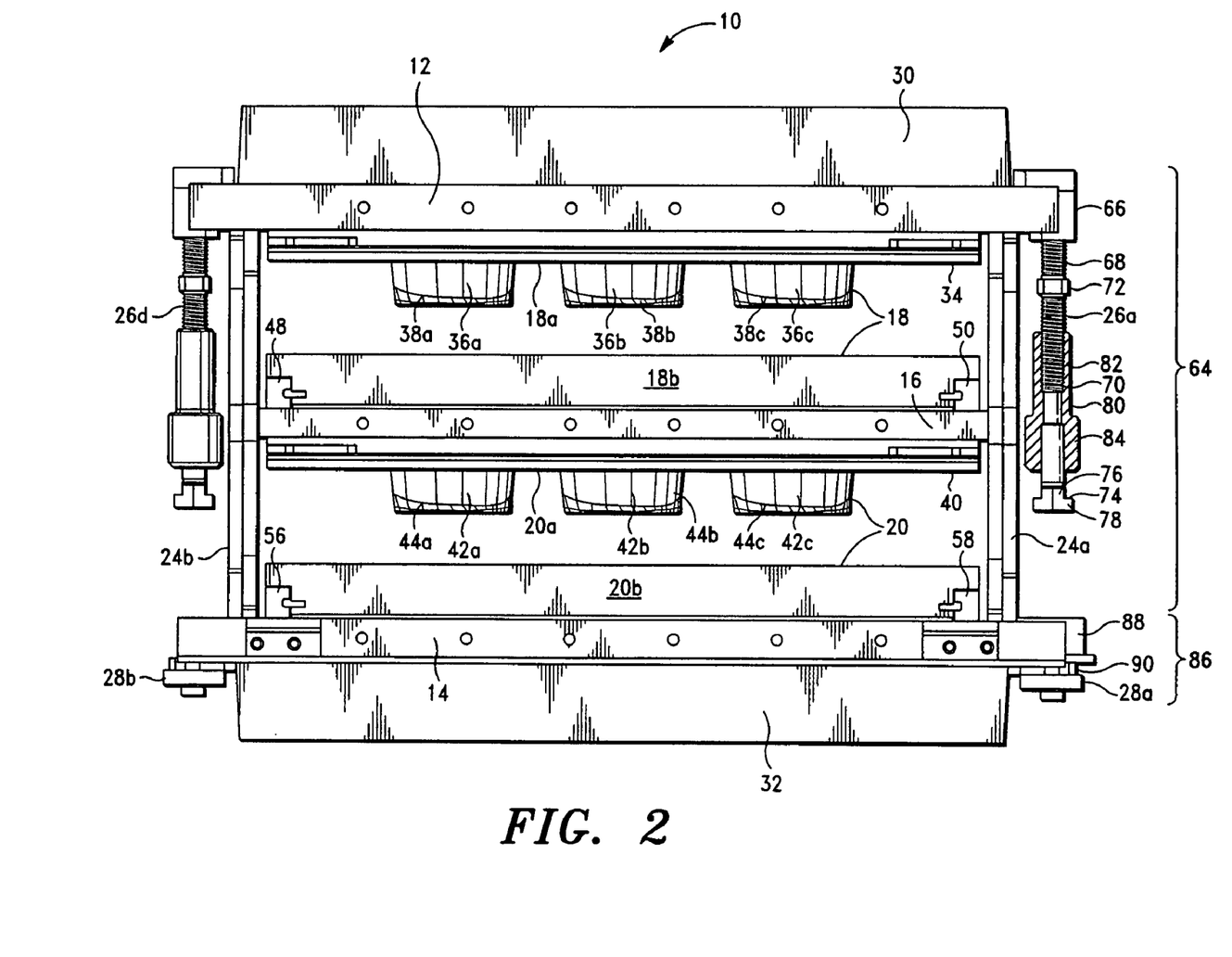
FIG. 2 is a front view of the flow molding apparatus of FIG. 1, wherein the apparatus is shown in the open position after the molds have been loaded.

As best shown in FIGS. 1 and 2, apparatus 10 also includes a first mold 18 disposed between top electrode 12 and intermediate electrode 16, and a second mold 20 disposed between bottom electrode 14 and intermediate electrode 16. First mold 18 comprises a top mold half 18a and a bottom mold half 18b that together define a molding cavity therebetween. Similarly, second mold 20 comprises a top mold half 20a and a bottom mold half 20b that together define a molding cavity therebetween. In this embodiment, first and second molds 18 and 20 are generally square-shaped so as to conform to the configuration of the electrodes. Preferably, first and second molds 18 and 20 have substantially the same thickness and capacitance so that the heating time for each mold will be substantially the same.

Looking to FIG. 2, top mold half 18a comprises a planar mounting plate 34 that is fixedly attached to the bottom surface of top electrode 12. Extending downwardly from mounting plate 34 are six posts 36a, 36b, 36c, 36d, 36e, 36f each of which supports a bladder 38a, 38b, 38c, 38d, 38e, 38f (wherein only three of the posts/bladders can be seen in FIG. 2). These posts and bladders are arranged in a 3×2 matrix configuration (as can be seen from FIG. 1).

Similarly, top mold half 20a comprises a planar mounting plate 40 that is fixedly attached to the bottom surface of intermediate electrode 16. Extending downwardly from mounting plate 40 are six posts 42a, 42b, 42c, 42d, 42e, 42f each of which supports a bladder 44a, 44b, 44c, 44d, 44e, 44f (wherein only three of the posts/bladders can be seen in FIG. 2). These posts and bladders are also arranged in a 3×2 matrix configuration (as can be seen from FIG. 1).

As is known in the art, each of the posts is formed of a relatively rigid non-conductive material that maintains its configuration, while each of the bladders is formed of a flexible non-conductive material that may be displaced upon pressurization. In this embodiment, the posts are formed of firm silicone rubber and the bladders are formed of liquid silicone rubber (preferably with 800% elongation and low hysterisis). Of course, other mold configurations and materials may also be used in accordance with the present invention.

Looking to FIG. 1, bottom mold half 18b comprises a tray 46 having edges 46a and 46b that are slideably attached to guide bars 48 and 50, respectively, which are in turn attached to the top surface of intermediate electrode 16. Formed within tray 46 are six cavities 52a, 52b, 52c, 52d, 52e, 52f for receiving a moldable material. As can be seen, these cavities are arranged in a 3×2 matrix configuration (similar to the posts and bladders of top mold half 18a described above). Similarly, bottom mold half 20b comprises a tray 54 having edges 54a and 54b that are slideably attached to guide bars 56 and 58, respectively, which are in turn attached to the top surface of bottom electrode 14. Formed within tray 54 are six cavities 60a, 60b, 60c, 60d, 60e, 60f for receiving a moldable material. As can be seen, these cavities are also arranged in a 3×2 matrix configuration (similar to the posts and bladders of top mold half 20a described above). In this embodiment, trays 46 and 54 are each formed of a relatively rigid non-conductive material, such as firm silicone rubber. Of course, other mold configurations and materials may also be used in accordance with the present invention.

In this embodiment, the moldable material placed within the cavities of trays 46 and 54 comprises a foam material (i.e., a moldable material that has been mixed with one or more blowing agents and/or cross-linkers to form a foam material). Of course, it should be understood that many different types of moldable materials may be used in accordance with the present invention.

Looking to FIGS. 1 and 2, it can be seen that the posts and bladders of top mold half 18a are adapted to be lowered into the cavities of bottom mold half 18b, and the posts and bladders of top mold half 20a are adapted to be lowered into the cavities of bottom mold half 20b. As such, the posts/bladders and cavities together define the size, shape and contour of the molded articles to be fabricated. In the illustrated example, the posts/bladders and cavities are configured to form twelve shoe soles (i.e., six shoe soles per mold). Of course, it should be understood that the molds could be adapted to form molded articles having a variety of different sizes, shapes and contours.

As shown in FIGS. 1 and 4, electromagnetic energy source 22 is operably connected to the electrodes such that top electrode 12 and bottom electrode 14 carry a first potential and intermediate electrode 16 carries a second potential. In this embodiment, top electrode 12 and bottom electrode 14 are grounded and intermediate electrode 16 carries a high voltage (which may range, for example, from ±3,000 volts to ±10,000 volts). Of course, electromagnetic energy source 22 could alternatively be connected such that top electrode 12 and bottom electrode 14 carry a high voltage and intermediate electrode 16 is grounded.

By connecting electromagnetic energy source 22 to the electrodes in this manner, a first alternating electric field may be established between top electrode 12 and intermediate electrode 16 (and thus across mold 18) and a second alternating electric field may be established between bottom electrode 14 and intermediate electrode 16 (and thus across mold 20). The alternating electric fields may be generated at frequencies ranging from 1 MHz to 500 MHz, are preferably generated at frequencies ranging from 10 MHz to 100 MHz, and are most preferably generated at either 26 MHz or 40 MHz.

Figure 3:
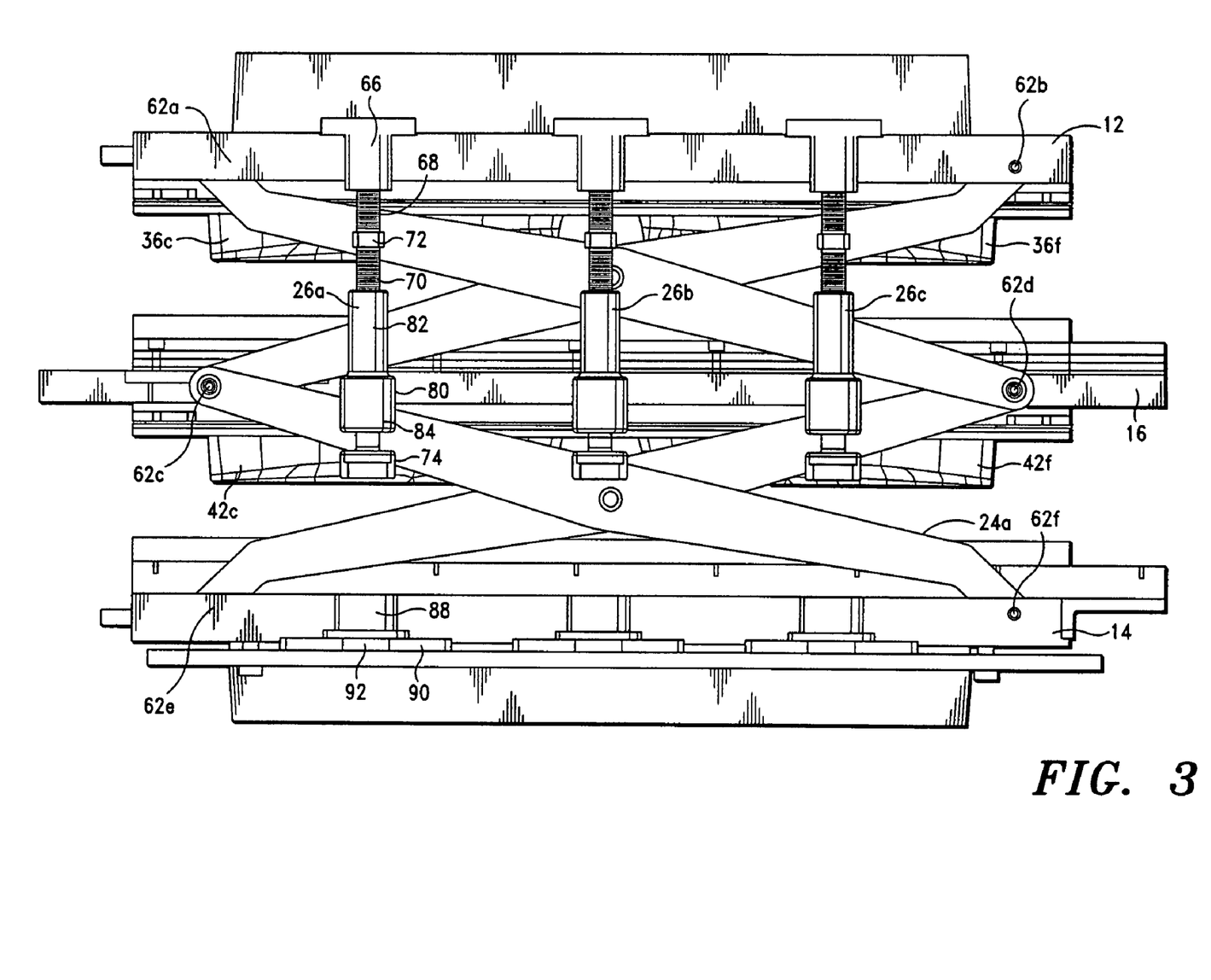
FIG. 3 is a side view of the flow molding apparatus of FIG. 2, showing a scissor mechanism that enables the apparatus to be moved between the open and closed positions.

Referring to FIGS. 1–4, a pair of scissor mechanisms 24a and 24b are provided that enable apparatus 10 to be moved between an open position (as shown in FIG. 1) and a closed position (as shown in FIG. 4). As best shown in FIG. 3, scissor mechanism 24a comprises multiple interconnected scissor arms that are connected to top electrode 12 at points 62a and 62b, to intermediate electrode 16 at points 62c and 62d, and to bottom electrode 14 at points 62e and 62f. Points 62b, 62d, 62f each comprise a fixed pin connection, while points 62a, 62c, 62e each comprise a pin-in-slot connection. Preferably, the distance between top electrode 12 and intermediate electrode 16 is substantially the same as the distance between bottom electrode 14 and intermediate electrode 16 to thereby maintain the electrodes in a parallel configuration. This arrangement allows scissor mechanism 24a to be expanded and contracted as desired. It should be understood that the configuration of scissor mechanism 24b (which is not fully shown in the drawings) is simply a mirror image of scissor mechanism 24a.

Looking again to FIGS. 1–4, six locking fixtures 26a, 26b, 26c, 26d, 26e and 26f are provided that may be used to lock apparatus 10 in the closed position. As will be described in detail hereinbelow with respect to locking fixture 26a, each of the locking fixtures comprises a first upper section attached to top electrode 12 and a second lower section attached to bottom electrode 14. It will be seen that these upper and lower sections are aligned so as to be mated with each other when apparatus 10 is moved to the closed position.

Referring to FIGS. 2 and 3, locking fixture 26a comprises an upper section 64 that includes a bracket 66 fixedly attached to top electrode 12 (such as with bolts). Extending downwardly from bracket 66 is an elongated body having a first threaded section 68 (e.g., with right-hand threads) connected to a second threaded section 70 (e.g., with left-hand threads) with a connector 72, which may be turned to make minor adjustments to the length of upper section 64. Second threaded section 70 also includes an unthreaded portion that terminates in a T-bolt 74. As can be seen, T-bolt 74 is comprised of a smaller section 76 (which forms the vertical leg of the "T") and a larger section 78 (which forms the horizontal leg of the "T"), which may be interlocked with a lock bar 28a (described hereinbelow) to secure apparatus 10 in the closed position. Upper section 64 also includes an elongated sleeve 80 having a first diameter portion 82 and a second diameter portion 84, wherein first diameter portion 82 has inner threads that engage second threaded section 70 to maintain sleeve 80 in a fixed position.

Locking fixture 26a also comprises a lower section 86 that includes a sleeve 88 positioned within an opening formed in bottom electrode 14. Sleeve 88 is connected to a bracket 90, which is in turn fixedly attached to the bottom surface of bottom electrode 14 (as best shown in FIG. 1). Sleeve 88 has an inside diameter that is slightly greater than the outside diameter of second diameter portion 84 of sleeve 80. As such, second diameter portion 84 of sleeve 80 may be received within sleeve 88 when apparatus 10 is moved to the closed position (as shown in FIG. 4). In this manner, sleeve 88 of lower section 86 serves as a guide for sleeve 80 of upper section 64.

It should be understood that the configuration of locking fixtures 26b, 26c, 26d, 26e and 26f are identical to the configuration of locking fixture 26a described hereinabove.

Figure 5A:
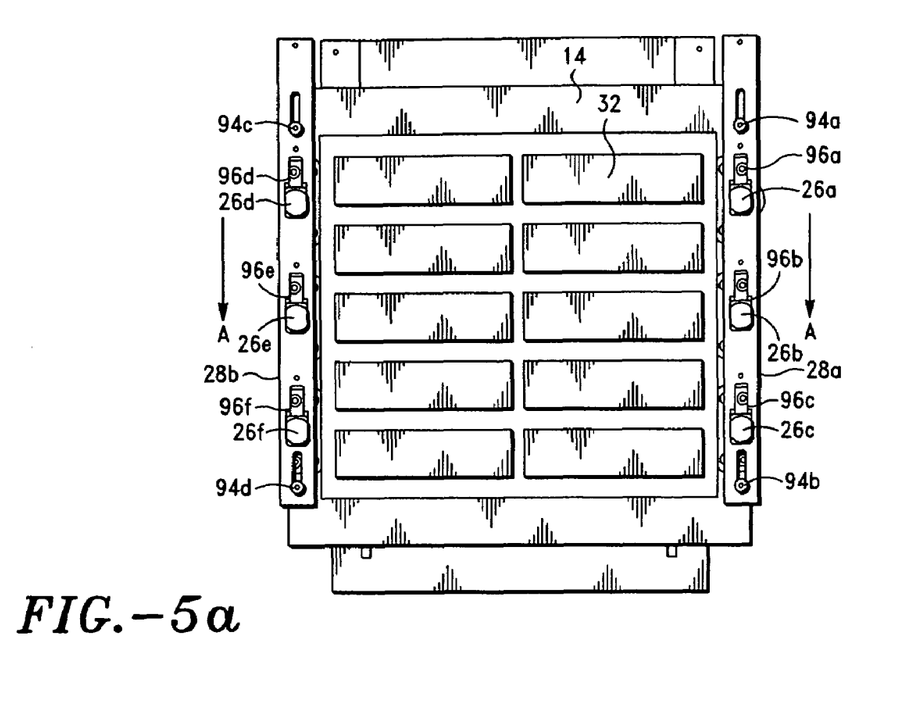
FIG. 5a is a bottom view of the flow molding apparatus of FIG. 4, wherein the lock bars are shown in the unlocked position.
Figure 5B:
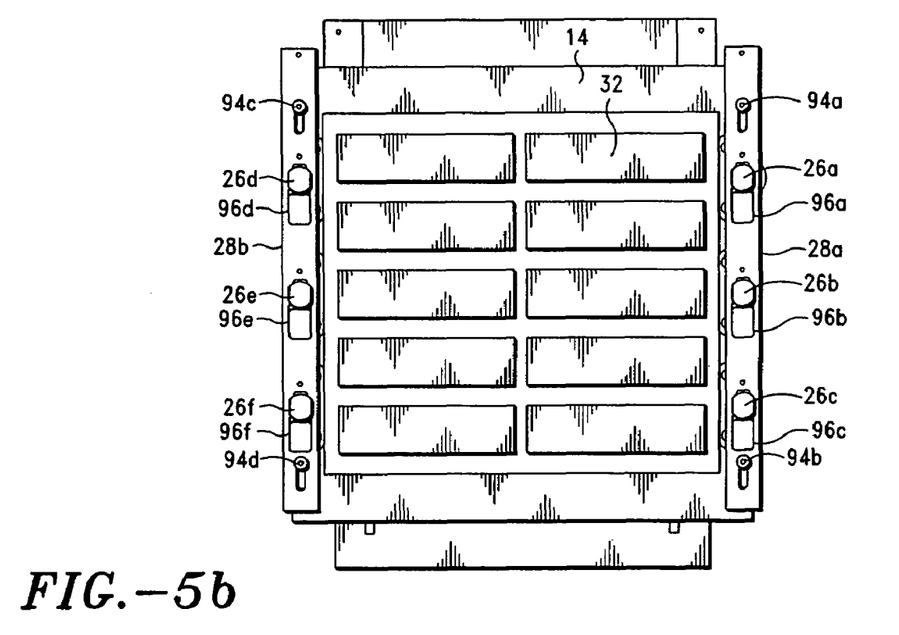
FIG. 5b is a bottom view of the flow molding apparatus of FIG. 4, wherein the lock bars are shown in the locked position.

Referring to FIGS. 5a and 5b, two lock bars 28a and 28b are also provided that are operable to interlock the upper and lower sections of each of the locking fixtures. As can be seen, lock bar 28a is slideably connected to the bottom surface of bottom electrode 14 via pin-in slot connections 94a, 94b, and lock bar 28b is slideably connected to the bottom surface of bottom electrode 14 via pin-in slot connections 94c, 94d. As such, lock bars 28a, 18b may be moved from an unlocked position (as shown in FIG. 5a) to a locked position (as shown in FIG. 5b) in the direction of arrow A.

Lock bars 28a and 28b have slots formed therein that correspond to locking fixtures 26a, 26b, 26c, 26d, 26e and 26f. Specifically, lock bar 28a has slots 96a, 96b, 96c for receiving the T-bolts of locking fixtures 26a, 26b, 26c, respectively, and lock bar 28b has slots 96d, 96e, 96f for receiving the T-bolts of locking fixtures 26d, 26e, 26f, respectively. As can be seen, each of the slots consists of a larger opening and a smaller opening that are dimensioned such that the larger section of the T-bolt (e.g., larger section 78 of T-bolt 74 of locking fixture 26a) can pass through the larger opening but not through the smaller opening. As such, when lock bars 28a and 28b are in the unlocked position (as shown in FIG. 5a), the larger sections of the T-bolts can be passed downwardly through the larger openings of the slots. However, when lock bars 28a and 28b are moved to the locked position (as shown in FIG. 5b), the larger sections of the T-bolts cannot pass upwardly through the smaller openings of the slots. Thus, this configuration allows apparatus 10 to be secured in the closed position (as shown in FIG. 4).

With reference to FIGS. 1, 4, 5a and 5b, the operation of flow molding apparatus 10 will now be described. First, apparatus 10 is moved to the open position shown in FIG. 1 to permit the loading of a foam material into cavities 52a, 52b, 52c, 52d, 52e, 52f of bottom mold half 18b and cavities 60a, 60b, 60c, 60d, 60e, 60f of bottom mold half 20b. After loading, apparatus 10 is moved to the closed position shown in FIG. 4, whereby the T-bolts of locking fixtures 26a, 26b, 26c pass downwardly through the larger openings of slots 96a, 96b, 96c of lock bar 28a and the T-bolts of locking fixtures 26c, 26d, 26e pass downwardly through the larger openings of slots 96c, 96d, 96e of lock bar 28b. Connector 72 of each of locking fixtures 26a, 26b, 26c, 26d, 26e, 26f may then be turned to adjust the position of the locking fixtures with respect to lock bars 28a and 28b (as required). Then, lock bars 28a and 28b are moved from the unlocked position shown in FIG. 5a to the locked position shown in FIG. 5b to thereby secure apparatus 10 in the closed position.

After locking apparatus 10, electromagnetic energy source 22 is activated so as to establish a first alternating electric field between top electrode 12 and intermediate electrode 16 (and thus across mold 18) and a second alternating electric field between bottom electrode 14 and intermediate electrode 16 (and thus across mold 20). Electromagnetic energy source 22 remains activated for a predetermined heating time (which is typically on the order of 10 seconds to 5 minutes) to thereby heat the foam material to its molding temperature. As is known in the art, molds 18 and 20 may also be pressurized such that the foam material will expand to the desired configuration within the cavities of bottom mold half 18b and bottom mold half 20b.

At the end of the heating cycle, apparatus 10 is cooled for a predetermined cooling time (which is typically on the order of 5 minutes to 20 minutes) by any suitable cooling technique. For example, as shown in FIG. 4, a coolant such as chilled water may be passed through a plurality of passages 98, 100, 102 formed in top electrode 12, bottom electrode 14, and intermediate electrode 16, respectively. Typically, molds 18 and 20 will remain pressurized during the cooling cycle.

Finally, at the end of the cooling cycle, lock bars 28a and 28b are moved from the locked position shown in FIG. 5b to the unlocked position shown in FIG. 5a. This permits the T-bolts of locking fixtures 26a, 26b, 26c to pass upwardly through the larger openings of slots 96a, 96b, 96c of lock bar 28a and the T-bolts of locking fixtures 26c, 26d, 26e to pass upwardly through the larger openings of slots 96c, 96d, 96e of lock bar 28b. Then, apparatus 10 is moved back to the open position shown in FIG. 1 to permit the unloading of the molded articles from cavities 52a, 52b, 52c, 52d, 52e, 52f of bottom mold half 18b and cavities 60a, 60b, 60c, 60d, 60e, 60f of bottom mold half 20b.

The steps described above may be performed in a production area that includes a plurality of different stations arranged in a rotary or circular configuration, an elongated conveyor configuration, or any other suitable configuration known in the art. For example, the production area may include a loading/unloading station (for loading the foam material into the cavities of the molds at the beginning of the molding cycle, and unloading the molded articles from the cavities of the molds at the end of the molding cycle), a heating station (for activating the electromagnetic energy source to thereby heat the foam material to its molding temperature), and a plurality of cooling stations (for passing a coolant through the passages in the electrodes). Of course, the number and types of stations may vary between different applications.

It should be understood that flow molding apparatus 10 described and illustrated hereinabove is merely an example of an apparatus that may be constructed in accordance with the present invention. One skilled in the art will appreciate that many other types of apparatus configurations are possible and within the scope of the invention. For example, while apparatus 10 includes two molds 18, 20 and three electrodes 12, 14, 16, it is possible to construct an apparatus having n molds and n+1 electrodes (wherein the maximum number for n is limited only by the time required to load/unload the molds and the size of the electromagnetic energy source connected to the electrodes). Preferably, the apparatus includes an even number of molds such that the two outer electrodes will carry the same potential and thereby permit the use of metallic locking fixtures.

The flow molding apparatus of the present invention has several advantages over the prior art. For example, because the apparatus may be configured such that the outer electrodes carry the same potential (e.g. both are grounded), there is no problem of shorting the electrodes together as in the prior art. A such, the locking fixtures attached to the outer electrodes may be formed of a metallic material. It can be appreciated that metallic locking fixtures are much stronger than those formed of insulative materials and, thus, may be smaller and simpler than the large clamps of the prior art.

Another advantage of the flow molding apparatus of the present invention is that the surface area of a single mold may be divided into a plurality of layered molds. By doing so, the force required to secure the apparatus in the closed position may be decreased to thereby permit the use of smaller locking fixtures. To illustrate this concept, suppose that apparatus A includes a single mold that measures 30 inches by 36 inches, and that the maximum force created in the mold during the molding cycle is 100 lb/inches$^2$. In this instance, the force required to secure apparatus A in the closed position is calculated as follows:

$$F=(30 \text{ inches}) \times (36 \text{ inches}) \times (100 \text{ lb/inches}^2)=108,000 \text{ lbs}$$

By contrast, suppose than apparatus B includes two layered molds each of which measures 30 inches by 18 inches (so that the total surface area of the two molds is the same as the total surface area of the single mold of apparatus A), and that the maximum force created in the mold during the molding cycle is 100 lb/inches$^2$. In this instance, the force required to secure apparatus B in the closed position is calculated as follows:

$$F=(30 \text{ inches}) \times (18 \text{ inches}) \times (100 \text{ lb/inches}^2)=54,000 \text{ lbs}$$

Thus, the force required to secure apparatus B in the closed position is one-half of the force required to secure apparatus A in the closed position. As such, apparatus B may be configured to include smaller and simpler locking fixtures. It should also be noted that the heating time for apparatus B is the same as the heating time for apparatus A due to the fact that the voltage between electrodes and the total capacitance is the same in both cases.

Yet another advantage of the flow molding apparatus of the present invention is that a plurality of molds may be layered on top of one another to thereby allow the manufacture of a greater number of molded articles in a single molding cycle. To illustrate this concept, suppose that apparatus C includes a single mold that measures 30 inches by 36 inches (which may be used to manufacture 6 molded articles), and that the maximum force created in the mold during the molding cycle is 200 lb/inches$^2$. In this instance, the force required to secure apparatus C in the closed position is calculated as follows:

$$F=(30 \text{ inches}) \times (36 \text{ inches}) \times (200 \text{ lb/inches}^2)=216,000 \text{ lbs}$$

By contrast, suppose than apparatus D includes two layered molds each of which measures 30 inches by 36 inches (each of which may be used to manufacture 6 molded articles), and that the maximum force created in the mold during the molding cycle is 200 lb/inches$^2$. In this instance, the force required to secure the apparatus in the closed position is calculated as follows:

$$F=(30 \text{ inches}) \times (36 \text{ inches}) \times (200 \text{ lb/inches}^2)=216,000 \text{ lbs}$$

Thus, the force required to secure apparatus C in the closed position is the same as the force required to secure apparatus D in the closed position. However, apparatus D may be used to manufacture twice as many molded articles in a single molding cycle as compared to apparatus C. Of course, it should be understood that layering additional molds on top of the two molds of apparatus D will not change the force required to secure the apparatus in the closed position but will allow the manufacture of an even greater number of molded articles.

While the present invention has been described and illustrated hereinabove with reference to an exemplary embodiment, it should be understood that various modifications could be made to this embodiment without departing from the scope of the invention. Therefore, the invention is not to be limited to the exemplary embodiment described and illustrated hereinabove, except insofar as such limitations are included in the following claims.

What is claimed and desired to be secured by Letters Patent is as follows:

1. A flow molding apparatus, comprising:
   first and second outer electrodes and at least one intermediate electrode arranged such that said intermediate electrode is positioned between said first and second outer electrodes;
   at least first and second molds arranged such that said first mold is disposed between said first outer electrode and said intermediate electrode and said second mold is disposed between said second outer electrode and said intermediate electrode; and
   an electromagnetic energy source operably connected to said first and second outer electrodes and said intermediate electrode in such a manner as to establish an alternating electric field across each of said first and second molds during a heating cycle.

2. The flow molding apparatus of claim 1, wherein said apparatus is moveable between an open position for loading or unloading said first and second molds and a closed position for activation of said electromagnetic energy source.

3. The flow molding apparatus of claim 2, further comprising at least one locking fixture configured to secure said apparatus in said closed position.

4. The flow molding apparatus of claim 3, wherein said locking fixture is formed of a metallic material.

5. The flow molding apparatus of claim 4, wherein said locking fixture has a first section fixedly attached to said first outer electrode and a second section fixedly attached to said second outer electrode.

6. The flow molding apparatus of claim 5, further comprising at least one lock bar operable to interlock said first and second sections of said locking fixture when said apparatus is moved to said closed position.

7. The flow molding apparatus of claim 2, further comprising a scissor mechanism connected to said first and second outer electrodes and said intermediate electrode so as to enable movement of said apparatus between said open and closed positions.

8. The flow molding apparatus of claim 3, wherein each of said first and second molds defines at least one cavity for receiving a moldable material.

9. The flow molding apparatus of claim 8, wherein said moldable material comprises a foam material.

10. The flow molding apparatus of claim 9, wherein said first and second molds are pressurized so that said foam material expands to form a molded article.

11. The flow molding apparatus of claim 10, wherein said locking fixture has a tensile strength that is sufficient to withstand said pressurization and thereby secure said apparatus in said closed position.

12. The flow molding apparatus of claim 2, wherein said first and second outer electrodes carry a first potential and said intermediate electrode carries a second potential during said heating cycle.

13. The flow molding apparatus of claim 12, wherein said first and second outer electrodes are grounded.

14. The flow molding apparatus of claim 13, further comprising at least one metallic locking fixture attached to said first and second outer electrodes to thereby secure said apparatus in said closed position.

15. The flow molding apparatus of claim 13, wherein said intermediate electrode carries a potential of at least ±3,000 volts.

16. A flow molding apparatus, comprising:
first and second outer electrodes and at least one intermediate electrode arranged such that said intermediate electrode is positioned between said first and second outer electrodes;
at least first and second molds arranged such that said first mold is disposed between said first outer electrode and said intermediate electrode and said second mold is disposed between said second outer electrode and said intermediate electrode;
at least one metallic locking fixture attached to said first and second outer electrodes to thereby secure said apparatus in a closed position; and
an electromagnetic energy source operably connected to said first and second outer electrodes and said intermediate electrode in such a manner as to establish an alternating electric field across each of said first and second molds during a heating cycle.

17. The flow molding apparatus of claim 16, wherein said locking fixture has a first section fixedly attached to said first outer electrode and a second section fixedly attached to said second outer electrode.

18. The flow molding apparatus of claim 17, further comprising a lock bar operable to interlock said first and second sections of said locking fixture when said apparatus is moved to said closed position.

19. The flow molding apparatus of claim 16, wherein said first and second molds are pressurized and said locking fixture has a tensile strength that is sufficient to withstand said pressurization and thereby secure said apparatus in said closed position.

20. The flow molding apparatus of claim 16, wherein said first and second outer electrodes carry a first potential and said intermediate electrode carries a second potential during said heating cycle.

21. The flow molding apparatus of claim 20, wherein said first and second outer electrodes are grounded and said intermediate electrode carries a potential of at least ±3,000 volts.

22. A flow molding apparatus, comprising:
first and second outer electrodes and at least one intermediate electrode arranged such that said intermediate electrode is positioned between said first and second outer electrodes;
at least first and second molds arranged such that said first mold is disposed between said first outer electrode and said intermediate electrode and said second mold is disposed between said second outer electrode and said intermediate electrode; and
an electromagnetic energy source operably connected to said first and second outer electrodes and said intermediate electrode such that said first and second outer electrodes carry a first potential and said intermediate electrode carries a second potential so as to establish an alternating electric field across each of said first and second molds during a heating cycle.

23. The flow molding apparatus of claim 22, wherein said first and second outer electrodes are grounded and said intermediate electrode carries a potential of at least ±3,000 volts.

24. The flow molding apparatus of claim 22, further comprising at least one metallic locking fixture attached to said first and second outer electrodes to thereby secure said apparatus in a closed position.

25. The flow molding apparatus of claim 24, wherein said first and second molds are pressurized and said locking fixture has a tensile strength that is sufficient to withstand said pressurization and thereby secure said apparatus in said closed position.

26. A flow molding apparatus, comprising:
a plurality of electrodes;
a plurality of molds arranged such that each of said molds is disposed between two of said electrodes; and
an electromagnetic energy source operably connected to said electrodes in such a manner as to establish an alternating electric field across each of said molds during a heating cycle.

27. The flow molding apparatus of claim 26, wherein said apparatus is moveable between an open position for loading and unloading said molds and a closed position for activation of said electromagnetic energy source.

28. The flow molding apparatus of claim 27, further comprising a scissor mechanism connected to said electrodes so as to enable movement of said apparatus between said open and closed positions.

29. The flow molding apparatus of claim 27, wherein said plurality of electrodes includes first and second outer electrodes, and wherein said apparatus further comprises at least one metallic locking fixture attached to said first and second outer electrodes to thereby secure said apparatus in said closed position.

30. The flow molding apparatus of claim 29, wherein said molds are pressurized and said metallic locking fixture has a tensile strength that is sufficient to withstand said pressurization and thereby secure said apparatus in said closed position.

31. The flow molding apparatus of claim 29, wherein said first and second outer electrodes are grounded and at least one other of said electrodes carries a potential of at least ±3,000 volts.

* * * * *